(12) United States Patent
Lawlor et al.

(10) Patent No.: US 8,205,767 B2
(45) Date of Patent: Jun. 26, 2012

(54) INFINITELY ADJUSTABLE BEVERAGE CONTAINER HOLDER BY SPIN ACTUATION

(75) Inventors: Michael Joseph Lawlor, Mequon, WI (US); Jeffrey Sadao Miki, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 985 days.

(21) Appl. No.: 11/554,818

(22) Filed: Oct. 31, 2006

(65) Prior Publication Data
US 2008/0099505 A1 May 1, 2008

(51) Int. Cl.
*B65D 25/00* (2006.01)
(52) U.S. Cl. .......................... 220/737; 222/93
(58) Field of Classification Search ............ 220/8, 737, 220/630, 729; 222/93, 92; 248/311.2, 316.2, 248/312, 313, 314, 315, 154, 309.1; 224/553, 224/571, 926; 279/60, 62, 71, 66; 141/368
See application file for complete search history.

(56) References Cited

U.S. PATENT DOCUMENTS

| | | | |
|---|---|---|---|
| 2,913,202 A * | 11/1959 | Meldrum | 47/40.5 |
| 4,561,200 A | 12/1985 | Hehn | |
| 4,981,277 A | 1/1991 | Elwell | |
| 5,024,411 A | 6/1991 | Elwell | |
| 5,033,709 A | 7/1991 | Yuen | |
| 5,054,733 A | 10/1991 | Shields | |
| 5,073,130 A | 12/1991 | Nakamura et al. | |
| 5,143,338 A | 9/1992 | Eberlin | |
| 5,149,032 A | 9/1992 | Jones et al. | |
| 5,154,380 A | 10/1992 | Risca | |
| 5,390,887 A | 2/1995 | Campbell | |
| D370,403 S | 6/1996 | Schenken et al. | |
| 5,533,700 A | 7/1996 | Porter | |
| 5,560,578 A | 10/1996 | Schenken et al. | |
| 5,601,269 A | 2/1997 | Jankovic et al. | |
| 5,782,448 A | 7/1998 | Withun et al. | |
| 5,791,618 A | 8/1998 | Lancaster | |
| 6,070,844 A | 6/2000 | Salenbauch et al. | |
| 6,092,775 A | 7/2000 | Gallant | |
| 6,443,800 B1 | 9/2002 | Rice | |
| 6,491,265 B2 | 12/2002 | Tracy | |
| 6,705,580 B1 * | 3/2004 | Bain | 248/311.2 |
| 6,834,838 B2 | 12/2004 | Dennis et al. | |
| 6,902,142 B1 | 6/2005 | Cheng et al. | |
| 6,983,918 B1 | 1/2006 | Leasure | |
| 2003/0197104 A1 | 10/2003 | Heybl et al. | |

FOREIGN PATENT DOCUMENTS
JP 11301334 11/1999
* cited by examiner

*Primary Examiner* — Anthony Stashick
*Assistant Examiner* — Jeffrey Allen
(74) *Attorney, Agent, or Firm* — Gifford, Krass, Sprinkle, Anderson & Citkowski, P.C.

(57) ABSTRACT

An adjustable beverage container includes an outer case having a case axis. An actuator ring, is rotatably coupled to the case. The actuator ring includes an arm extension push member and an arm retraction structure. A cover ring is fixedly attached to the case. An arm having an engagement structure including a slot or tab slidingly is engaged with the arm retraction structure of the actuator ring. The arm is also rotatably attached to the case and cover ring. The arm moves into and away from said case axis when the actuator ring is rotated relative to the case about the case axis.

14 Claims, 5 Drawing Sheets

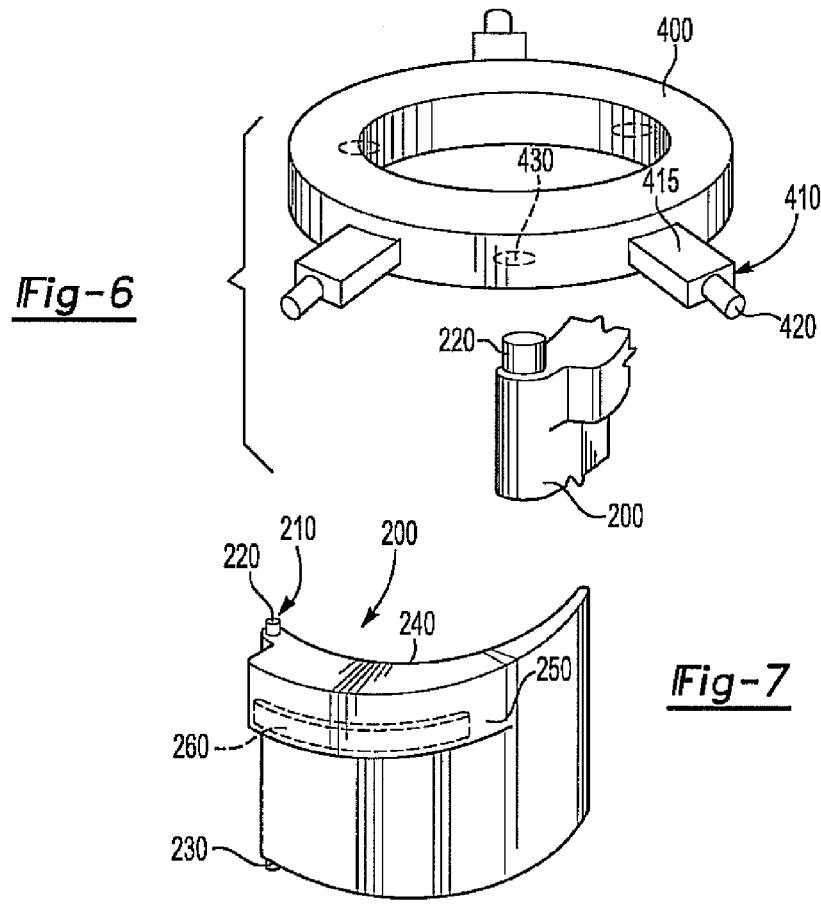
Fig-6
Fig-7
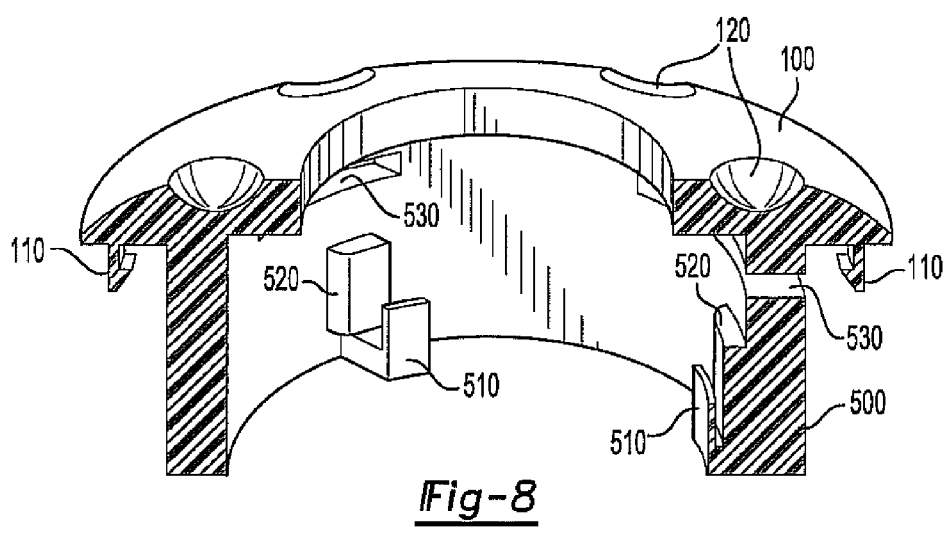
Fig-8

US 8,205,767 B2

INFINITELY ADJUSTABLE BEVERAGE CONTAINER HOLDER BY SPIN ACTUATION

FIELD OF THE INVENTION

The present invention relates in general to a beverage container holder and in particular to an infinitely adjustable by spin actuation beverage container holder.

BACKGROUND OF THE INVENTION

Beverage container holders are commonplace in current motor vehicles. The placement of a beverage container holder in an automobile or truck aids the driver in operating the vehicle in a safe manner. In addition, the comfort of a long trip is increased when a beverage container can be safely and securely placed within the vehicle and yet easily accessed by the driver and/or a passenger. However, current beverage container holders are typically manufactured with a single inner diameter. As such, bottles, cups, glasses and other types of beverage containers can either be too large to fit within the holder or too small to be held securely.

In an effort to provide a beverage container holder that holds various sizes of containers, some holders have incorporated flexible flaps within the inner diameter of the holder, which thereby apply pressure to a container placed therein. However, these flaps become torn, damaged and ineffective due to a loss of resiliency over extended periods of time. Furthermore, some beverage containers are still too small to be held securely with flexible flaps within the inner diameter of the holder. Therefore, there is a need for a beverage container holder that has an adjustment for holding different size containers.

SUMMARY OF THE INVENTION

The present invention affords an adjustable beverage container holder. The holder has an outer case, an actuator ring, a cover ring, at least one container holding arm and a dial. In the alternative, the dial and the actuator ring are one piece. The outer case has a case axis and holds the actuator ring, the cover ring and the at least one holding arm.

The at least one holding arm is rotateably attached to an inner flange of the outer case and the cover ring which is fixedly attached to the outer case. The actuator ring is engaged with the at least one holding arm and the dial. The dial is rotateably coupled to the outer casing and rotates relative to said casing about the case axis. With engagement of the dial to the actuator ring, and engagement of the actuator ring to the at least one holding arm, rotation of the dial affords for the extension and/or retraction of the holding arm towards or away from the case axis. In this manner, an adjustable beverage container holder is provided.

BRIEF DESCRIPTION OF THE FIGURES

FIG. 6 is a perspective view of a beverage container holder arm;
FIG. 7 is a perspective and cross-sectional view of a dial and actuator arm of the present invention;
FIG. 8 is a perspective view of a cover ring of the present invention.

DETAILED DESCRIPTION OF THE INVENTION

Figure 1:
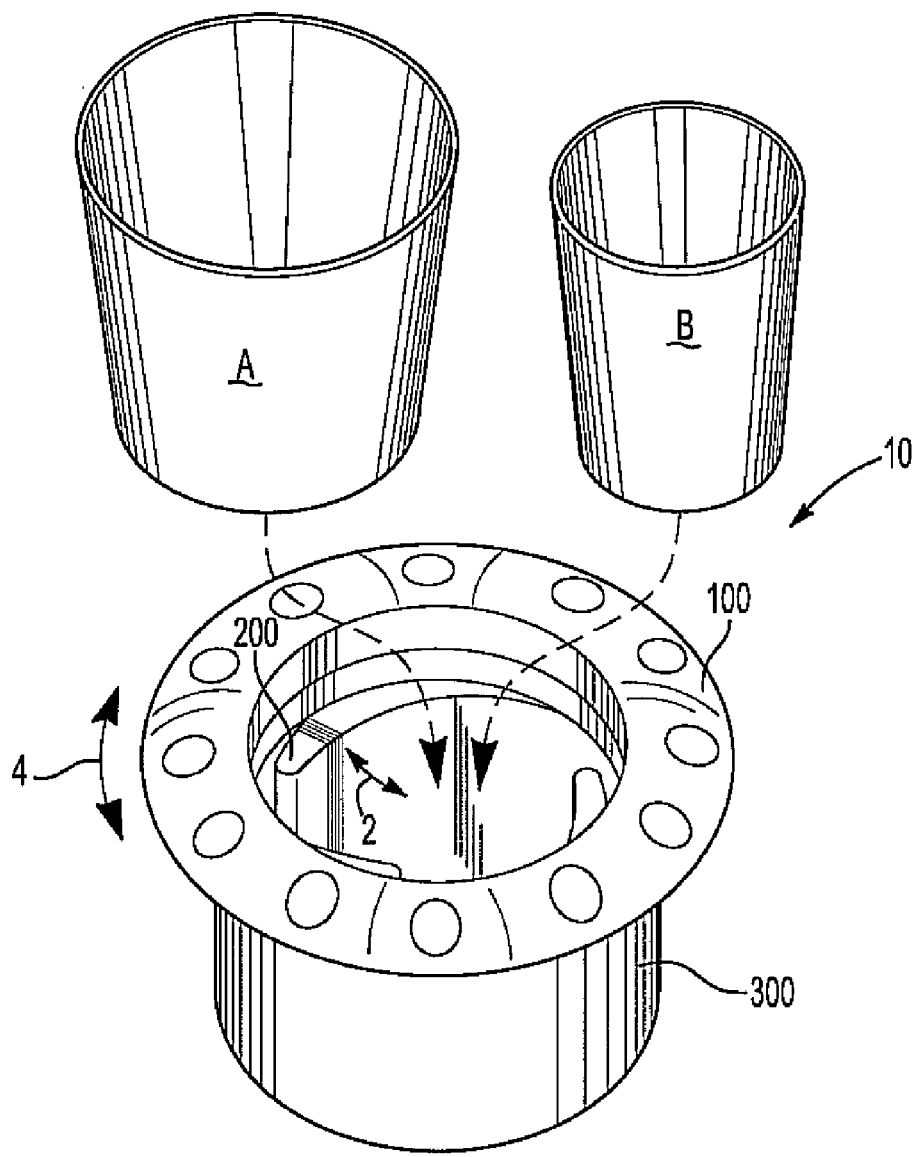
FIG. 1 is an inventive beverage container holder.
Figure 2:
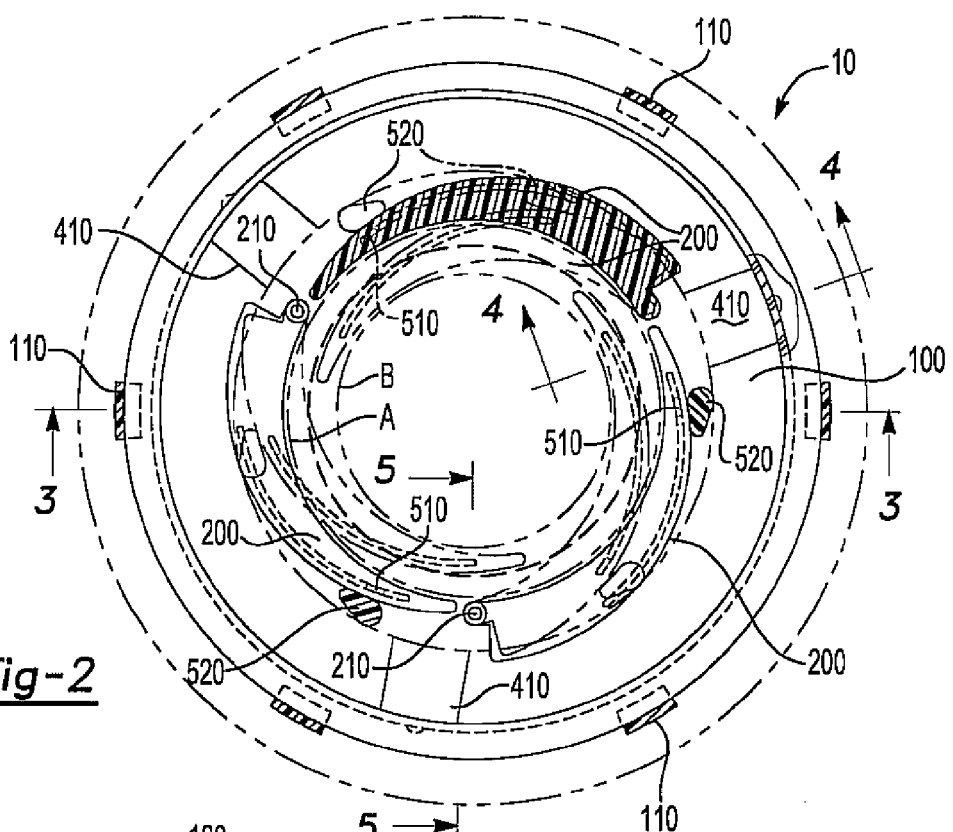
FIG. 2 is a top view of an inventive beverage container holder.

In accordance with the present invention, an adjustable beverage container holder is generally shown at 10 in FIGS. 1 and 2. The container holder 10 is comprised of a dial 100, at least one beverage container holder arm 200, an outer casing 300 and a cover ring 400. The adjustable beverage container holder 10 affords for the movement of a holder arm 200 in an inward or outward direction 2 when the dial 100 is rotated in a clockwise or counterclockwise direction 4.

Located within the beverage container 10 is at least one holder arm 200, with each arm 200 having a pivot axis 210. As illustrated, holder 10 has a structure wherein the outer surface is cylindrical in form. In the alternative, the present invention can be comprised of an outer surface that is not cylindrical in form.

Figure 3:
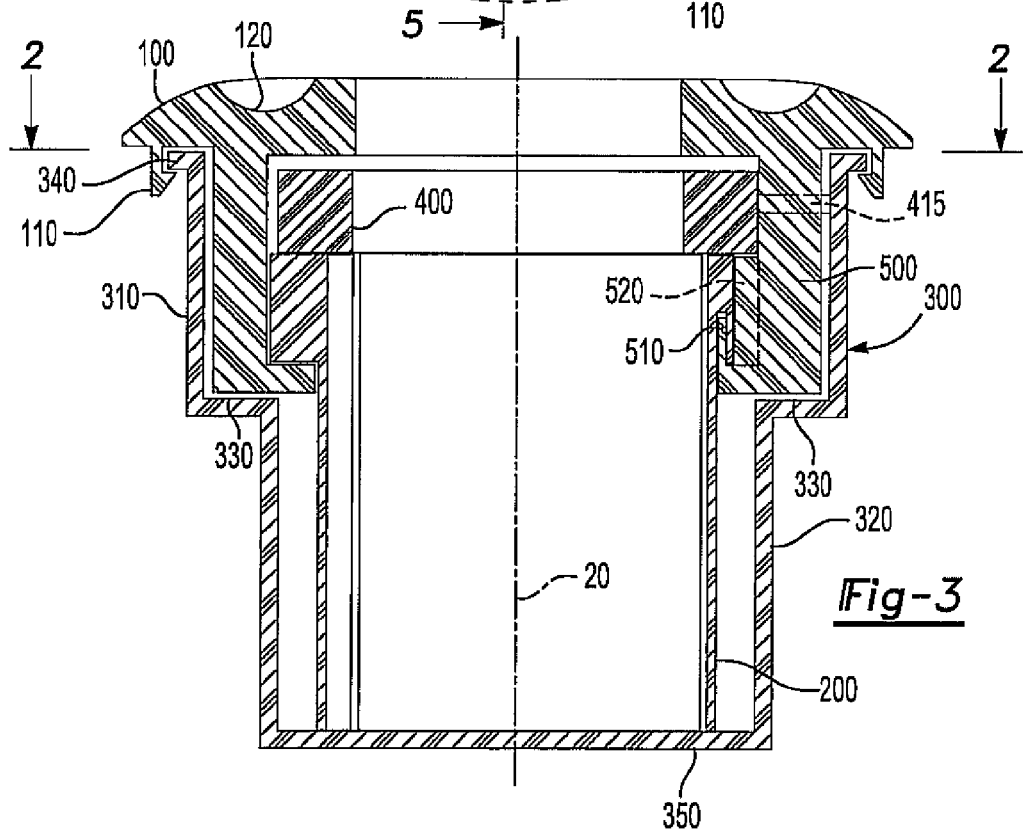
FIG. 3 is a cross-sectional view of the section 3-3 shown in FIG. 2.
Figure 4:
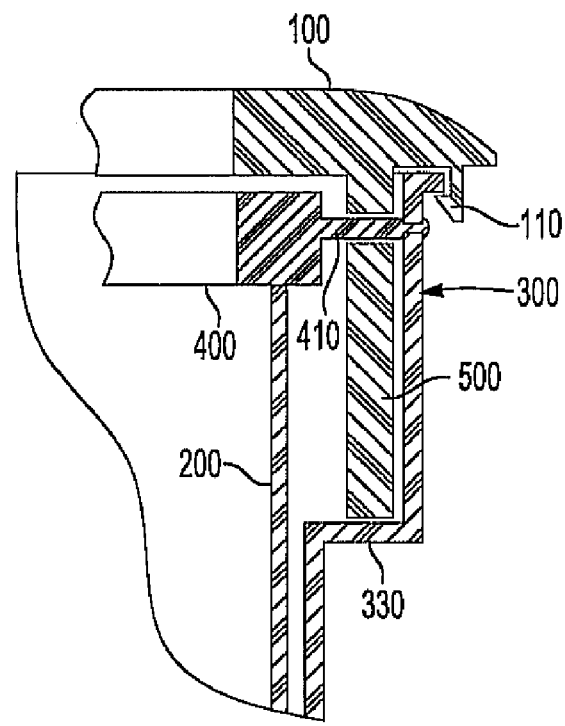
FIG. 4 is a cross-sectional view of 4-4 shown in FIG. 2.
Figure 5:
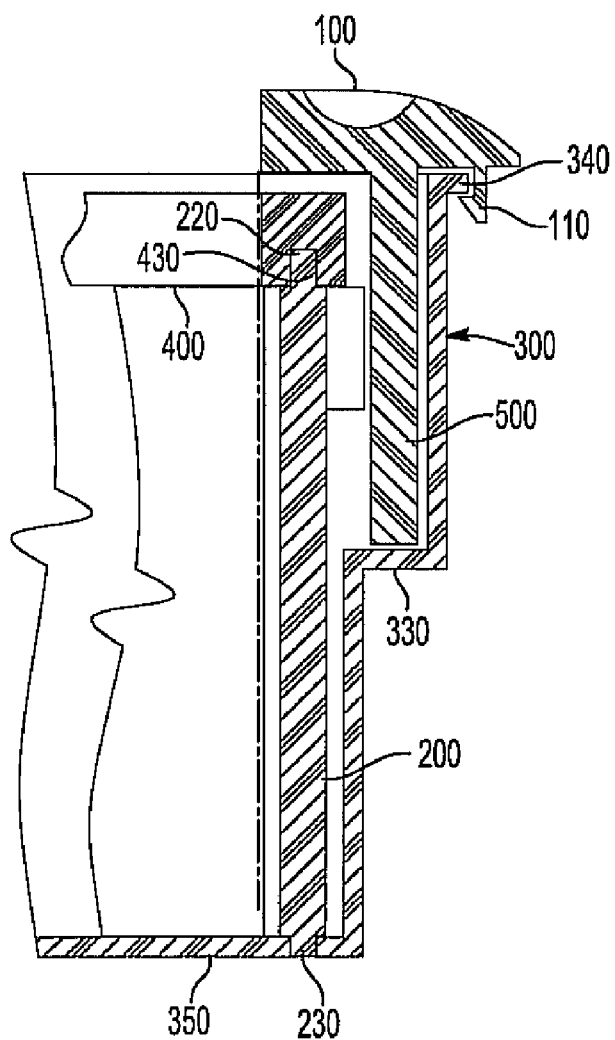
FIG. 5 is a cross-sectional view of 5-5 shown in FIG. 2.

Turning to FIGS. 3 through 5, FIG. 3 shows a cross section of the section 3-3, FIG. 4 shows a cross section of the section 4-4 and FIG. 5 shows a cross section of the section 5-5 shown in FIG. 2. The dial 100 has a case coupling structure 110 engaging a coupling structure 340 of outer casing 300. For illustrative purposes only, FIG. 3 shows the case coupling structure 110 and coupling structure 340 as an L-shaped bracket and a top flange, respectively. In the alternative, the coupling structure 110 and 340 can be comprised of any type of coupling device known to those skilled in the art, illustratively including a detent, a slot with an extended member fit therein, tracks attached to dial 100 and outer casing 300 with ball bearings therebetween and combinations thereof. In this manner, the dial 100 is rotatably coupled to case 300 and affords for rotation of the dial 100 relative to case 300 about a case axis 20.

The outer casing 300 also has a top inner diameter area 310, a bottom inner diameter area 320, a shoulder area 330 and a bottom flange 350. The shoulder area 330 adjoins said top inner diameter area 310 and bottom diameter area 320. In the alternative, outer casing 300 only has one inner diameter and no shoulder area 330. Also in the alternative, outer casing has more than two inner diameters and more than one shoulder area adjoining the plurality of inner diameters. For illustrative purposes only, the bottom flange 350 is continuous across the bottom of outer casing 300. In the alternative, the bottom flange 350 is not continuous across the bottom of outer casing 300.

The dial 100 is engaged with an actuator ring 500, said ring 500 located at least partially within the outer casing 300. The dial 100 and actuator ring 500 can be formed as a single unit, or in the alternative, the dial 100 and actuator ring 500 are not formed as a single unit and have an engaging structure to attach one to the other, illustratively including a tab, a slot, an adhesive and combinations thereof. In addition, dial 100 and actuator ring 500 can each be comprised of more than one piece in order, for example, to facilitate the manufacturing and/or assembly thereof. With dial 100 and actuator ring 500 engaged, rotation of dial 100 relative to the outer casing 300 about axis 20 affords for the movement of actuator ring 500 on an arcuate path within said casing 300.

In the present embodiment, the actuator ring 500 is located above shoulder area 330. In the alternative, the outer casing 300 has a single inner diameter 310 with actuator ring 500 located anywhere therein. For example, actuator ring 500 can extend the approximate length of outer casing 300. For purposes of the present invention, approximate length is defined as not less than 75 percent of the total length. In addition, the actuator ring 500 can be located on the outside of casing 300.

A cover ring 400 is fixedly attached to outer casing 300 using attachment structure 410 (FIG. 4). In the alternative, outer casing 300 and cover ring 400 can be one piece. Referring to FIG. 6, the attachment structure 410 is comprised of a tab 415 with a rod 420 extending therefrom. Rod 420 fits within an aperture or slot in outer casing 300 (not shown). In the alternative, the attachment structure 410 is comprised of a tab 415 without a rod 420, a rod 420 without a tab 415, or a slot which allows a tab or rod from the outer casing to insert therein.

The beverage container holder 10 with dial 100, holder arm 200, outer casing 300, cover ring 400 and actuator ring 500 can be manufactured by any material known to those skilled in the art, illustratively including fiberglass, plastics, metals, ceramics and combinations thereof. Furthermore, the movement of dial 100, holder arm 200, outer casing 300, cover ring 400 and actuator ring 500 relative to each other can be assisted using material and components known to those skilled in the art, illustratively including lubricants and bearings.

FIG. 7 shows a perspective view of holder arm 200. The holder arm 200 has a container holding surface 240, an extension push surface 250 and an engagement structure 260, and a first end 220 and a second end 230 of axis 210. Insertion of the first end 220 of arm 200 within aperture 430 of ring 400 (FIGS. 5 and 6) and the second end 230 within bottom flange 350 of outer casing 300 (FIG. 5) affords for rotatable attachment of arm 200 to outer casing 300 and cover ring 400. FIG. 7 also illustrates first end 220 and second end 230 as a rod or pin. In the alternative, first end 220 and second end 230 can be comprised of a sleeve which accepts a pin or rod extending from cover ring 400 and lower flange 350, respectively.

The engagement structure 260 is shown as a slot in FIG. 7 for illustrative purposes only. Engagement structure 260 can be comprised of a tab, rod, pin or rail, and affords engagement with an arm retraction structure 510 of actuator ring 500 (FIG. 8). As illustrated in FIG. 8, the retraction structure 510 of actuator ring 500 is in the form of a tab. In the alternative, arm retraction structure 510 can be in the form of a rod, pin, rail or slot. The actuator ring 500 also has an extension push member 520 which is adjacent to and in contact with extension push surface 250 when the present invention is assembled as shown in FIGS. 1 and 2.

With dial 100 engaged with actuator ring 500, and actuator ring 500 engaged with arm 200, rotation of dial 100 affords for extension push member 520 to push upon extension push surface 250 and extend holder arm 200 towards axis 20. In addition, rotation of dial 100 in an opposite direction affords for arm refraction structure 510 to pull on retraction structure 260 and retract arm 200 away from axis 20. In this manner, the arm 200 is slidingly engaged with the actuator ring 500 and a beverage container can be placed within holder 10 and securely held and/or released by rotating dial 100, which thereby rotates holder arm 200 into contact with or releases arm 200 from said beverage container.

In the alternative, the present invention does not require dial 100 in order to be operative. The actuator ring 500 can be rotatably attached to outer casing 300 and move or rotate relative to said casing about case axis 20 on an arcuate path within said casing, and thereby afford for the extension push member 520 to push upon extension push surface 250 and extend holder arm 200 towards axis 20. In addition, movement or rotation of actuator ring 500 in an opposite direction affords for arm retraction structure 510 to pull on retraction structure 260 and retract arm 200 away from axis 20. The actuator ring 500 can also be located on the outside of the outer casing 300 and afford for the pushing and retracting of arm 200 towards and away from axis 20.

Figure 9:
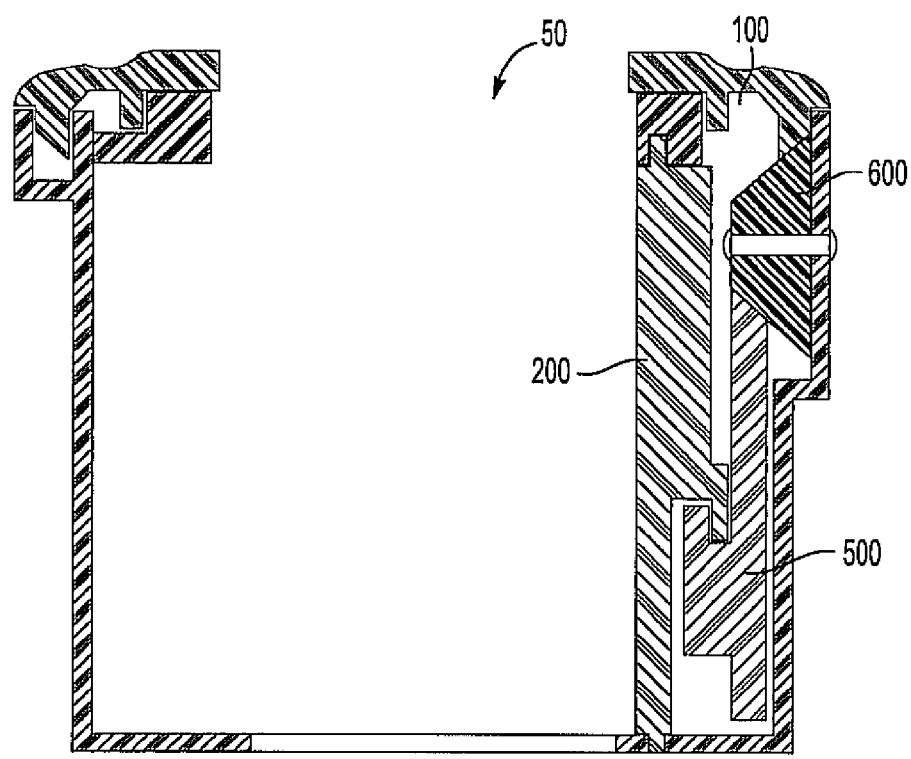
FIG. 9 is a cross-sectional view of a second embodiment of the present invention.

A second embodiment of the present invention is shown in FIG. 9. In this embodiment, the dial 100 is engaged with a reduction gear 600. The reduction gear 600 is also engaged with actuator ring 500. Although the actuator ring 500 as illustrated in FIG. 9 has a different shape than the actuator ring illustrated in the previous figures, the function is the same. That is, actuator ring 500 affords for the extension towards and retraction away from axis 20 of arm 200 using extension push member 520 and an arm retraction structure 510.

The invention is not restricted to the illustrative examples described above. The examples are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

The invention claimed is:

1. An adjustable beverage container holder comprising:
   an outer case having a case axis;
   an actuator ring, said ring rotatably coupled to said case and having an arm extension push member and an arm retraction structure;
   a cover ring fixedly attached to said case; and
   an arm having an engagement structure including a slot or tab slidingly engaged with said arm retraction structure of said actuator ring, said arm including a pivot axis having a first and second end, the first positioned in a notch of said cover ring and defining an upper pivot, the first end rotatable in the notch and the second end rotatably attached to said case, said arm including a push surface contacting said arm extension push member and said arm including a retraction track engaging said arm retraction structure;
   wherein said arm moves into and away from said case axis when said actuator ring is rotated relative to said case about said case axis.

2. The invention of claim 1, wherein said case has a top inner diameter area, a bottom inner diameter area and a shoulder area adjoining said top and bottom diameter areas.

3. The invention of claim 2, wherein said actuator ring is located above said shoulder area.

4. The invention of claim 1, wherein said actuator ring is located on the outside of said case.

5. The invention of claim 1, wherein said case has a top flange and a bottom flange.

6. The invention of claim 1, further comprising a dial, said dial rotatably coupled to said case and engaged with said actuator ring moving said arm into and away from said case axis when said actuator ring is rotated relative to said case about said case axis.

7. The invention of claim 1, wherein said actuator ring has a dial engaging structure.

8. The invention of claim 7, wherein said dial engaging structure is selected from the group consisting of a tab, a slot, a weld, an adhesive and combinations thereof.

9. The invention of claim 1, wherein said arm retraction structure is selected from the group consisting of a tab, a rod, a pin, a rail and a slot.

10. The invention of claim 1, wherein the first end and the second end of said pivot axis include structures selected from the group consisting of a rod, a pin, a sleeve and combinations thereof.

11. The invention of claim 1, wherein said cover ring is fixedly attached to said case using an attachment structure selected from the group consisting of a tab, a rod, a pin, a slot, an aperture and combinations thereof.

12. The invention of claim 6, wherein said dial and said actuator ring are one piece.

13. The invention of claim 1, wherein said outer case and said cover ring are one piece.

14. An adjustable beverage container holder comprising:
- an outer case having a case axis, a receiving slot, an outer flange, an inner flange, a top inner diameter, a bottom inner diameter and a shoulder area adjoining said top and bottom diameters;
- an actuator ring having a receiving slot, an extension push member and a retraction pull member, said ring located within said case and above said shoulder area;
- a beverage container holding arm having a retraction track, a pivot axis, a push surface and a container surface, said track slidingly engaging said pull member of said actuator ring, said pivot axis having a first end and a second end, said first end rotatably attached to said inner flange of said case, said push surface adjacent to said push member of said actuator ring and said container surface co-axial to said case axis;
- a cover ring having a stationary tab and an axis receiving aperture, said tab engaging said receiving slot of said case holding said cover ring stationary with respect to said case and said aperture engaging said second end of said pivot axis rotatably attaching said arm to said cover ring; and
- a dial having an L-shaped bracket and a tab, said L-shaped bracket engaging said outer flange of said case rotatably coupling said dial to said case and said tab engaging said slot of said actuator ring moving said holding arm into and away from said case axis when said dial is rotated relative to said case about said case axis.

* * * * *